United States Patent
Kolb et al.

(10) Patent No.: US 12,519,175 B2
(45) Date of Patent: Jan. 6, 2026

(54) BATTERY APPARATUS AND WORK SYSTEM

(71) Applicant: Andreas Stihl AG & Co. KG, Waiblingen (DE)

(72) Inventors: Joachim Kolb, Ludwigsburg (DE); Marcel Wilka, Boebingen (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 410 days.

(21) Appl. No.: 15/931,205

(22) Filed: May 13, 2020

(65) Prior Publication Data

US 2020/0365869 A1  Nov. 19, 2020

(30) Foreign Application Priority Data

May 14, 2019 (EP) .................................. 19174310

(51) Int. Cl.

| H01M 2/12 | (2006.01) |
|---|---|
| H01M 2/20 | (2006.01) |
| H01M 2/34 | (2006.01) |
| H01M 10/04 | (2006.01) |
| H01M 50/30 | (2021.01) |

(Continued)

(52) U.S. Cl.

CPC ....... *H01M 50/30* (2021.01); *H01M 50/3425* (2021.01); *H01M 50/503* (2021.01);

(Continued)

(58) Field of Classification Search

CPC .. H01M 6/00; H01M 10/0422; H01M 50/107; H01M 50/14; H01M 50/179;

(Continued)

(56) References Cited

U.S. PATENT DOCUMENTS

| 5,418,083 A | 5/1995 | Tamaki et al. |
|---|---|---|
| 8,062,785 B2 | 11/2011 | Kishii et al. |

(Continued)

FOREIGN PATENT DOCUMENTS

| CN | 103258981 A | 8/2013 |
|---|---|---|
| CN | 107039688 A | 8/2017 |

(Continued)

OTHER PUBLICATIONS

Tiede et al; "Description DE102017211006A1"; Machine Translation of DE 102017211006 A1 obtained from EPO Patent Translate (Year: 2017).*

(Continued)

*Primary Examiner* — Allison Bourke
*Assistant Examiner* — Charlene Bermudez
(74) *Attorney, Agent, or Firm* — Crowell & Moring LLP

(57) ABSTRACT

A battery apparatus supplies electrical drive power to an electrically driven work appliance. The battery apparatus includes at least one battery cell. The battery cell has a terminal with a safety valve. The safety valve is embodied with a moving part of a surface of the terminal, with movement from a closed position for outward movement into an open position. The battery apparatus includes at least one cell contacting device. The cell contacting device has electrical contact with the terminal by way of at least one integral connection in the closed position of the moving part and allows the movement of the moving part.

14 Claims, 2 Drawing Sheets

(51) Int. Cl.
*H01M 50/342* (2021.01)
*H01M 50/503* (2021.01)
*H01M 50/522* (2021.01)
*H01M 50/548* (2021.01)
*H01M 50/559* (2021.01)
*H01M 50/578* (2021.01)

(52) U.S. Cl.
CPC ....... *H01M 50/522* (2021.01); *H01M 50/548* (2021.01); *H01M 50/559* (2021.01); *H01M 50/578* (2021.01); *H01M 2200/20* (2013.01); *H01M 2220/30* (2013.01)

(58) Field of Classification Search
CPC .. H01M 50/242; H01M 50/30; H01M 50/317; H01M 50/325; H01M 50/358; H01M 50/375; H01M 50/502; H01M 50/514; H01M 50/528; H01M 50/559; H01M 50/564; H01M 50/50; H01M 50/3425; H01M 10/0431; H01M 10/052; H01M 10/0525; H01M 10/0587; H01M 10/286; H01M 2200/20; H01M 2220/30; H01M 2250/30; H01M 10/0436; H01M 10/283; H01M 50/342; H01M 50/213; H01M 50/516; H01M 50/536; H01M 6/42; H01M 6/44; H01M 50/24; H01M 50/26; H01M 50/291; H01M 50/247
See application file for complete search history.

(56) References Cited

U.S. PATENT DOCUMENTS

| | | | |
|---|---|---|---|
| 2010/0156350 A1 | 6/2010 | Murayama et al. | |
| 2011/0117408 A1* | 5/2011 | Lennox | H01M 50/512 |
| | | | 429/99 |
| 2011/0123845 A1 | 5/2011 | Kusama et al. | |
| 2013/0216895 A1 | 8/2013 | Fritz et al. | |
| 2015/0380700 A1 | 12/2015 | Hasegawa et al. | |
| 2016/0049626 A1 | 2/2016 | Yasui et al. | |
| 2017/0047566 A1* | 2/2017 | Okuda | H01G 11/76 |
| 2018/0083251 A1 | 3/2018 | Newman | |
| 2020/0313129 A1* | 10/2020 | Koutari | H01M 50/20 |

FOREIGN PATENT DOCUMENTS

| | | | | |
|---|---|---|---|---|
| CN | 109417139 A | * | 3/2019 | .......... H01M 10/643 |
| DE | 693 05 061 T2 | | 2/1997 | |
| DE | 10 2014 019 416 A1 | | 6/2016 | |
| DE | 10 2015 007 134 A1 | | 12/2016 | |
| DE | 20 2018 106 375 U1 | | 12/2018 | |
| DE | 102017211006 A1 | * | 1/2019 | |
| EP | 2 339 672 A1 | | 6/2011 | |
| EP | 3 444 865 A1 | | 2/2019 | |
| JP | H10106533 A | * | 8/1996 | ............. H01M 2/22 |
| JP | 2010-146879 A | | 7/2010 | |
| JP | 2012-195219 A | | 10/2012 | |
| JP | 2017-152172 A | | 8/2017 | |
| WO | WO-2019244392 A1 | * | 12/2019 | .......... H01M 50/213 |

OTHER PUBLICATIONS

Marukawa et al; "JPH10106533A Battery Interconnecting Structure"; Machine Translation of JPH10106533A obtained from Espacenet (Year: 1996).*

Chinese-language Office Action issued in Chinese Application No. 202010407687.6 dated Aug. 26, 2023 with English translation (17 pages).

* cited by examiner

BATTERY APPARATUS AND WORK SYSTEM

FIELD OF APPLICATION AND PRIOR ART

The invention relates to a battery apparatus for supplying electrical drive power to an electrically driven work appliance and to a work system having such a battery apparatus and an electrically driven work appliance.

Problem and Solution

The object of the invention is that of providing a battery apparatus for supplying electrical drive power to an electrically driven work appliance, wherein the battery apparatus has improved properties, in particular being safer, and a work system having such a battery apparatus and an electrically driven work appliance.

The invention achieves the object by providing a battery apparatus and a work system according to the claimed invention. Advantageous developments and/or configurations of the invention are described and claimed herein.

The battery apparatus according to the invention is embodied or configured to supply, in particular automatically supply, electrical drive power to an electrically driven work appliance, in particular a garden, forestry and/or construction work appliance. The battery apparatus has at least one battery cell and at least one cell contacting device. The battery cell has a terminal with a safety valve. The safety valve is embodied or configured with a moving part of a surface of the terminal, with movement from a closed position for outward movement or opening into an open position. In the closed position of the moving part, the cell contacting device has an electrical contact or an electrical connection, in particular a direct electrical contact or electrical connection, with the terminal by means of at least one integral connection. Moreover, the cell contacting device allows the movement of the moving part, in particular from the closed position into the open position.

The safety valve, in particular with the moving part in the open position, facilitates a discharge of exhaust gas from the inside or from within the battery cell to the outside or to outside of the battery cell, in particular when a pressure of exhaust gas generated by an electrochemical reaction occurring on the inside or within the battery cell exceeds a predetermined limit pressure. This may allow damage to remain small, particularly even if the battery cell can have a relatively high energy content.

The cell contacting device allows the safety valve to open, in particular the moving part. In other words: the cell contacting device cannot or need not hold the safety valve shut.

The integral connection facilitates a reliable electrical contact, particularly in the case of corrosion of the terminal and/or of the cell contacting device, for example in contrast to an electrical contact by way of a force-fit connection.

In particular, the at least one battery cell can be embodied to supply drive power to the work appliance. In addition or as an alternative thereto, the battery cell can be either a primary cell, in particular a non-rechargeable primary cell, or a secondary cell, in particular a rechargeable secondary cell, or accumulator cell. In particular, the battery cell can be a lithium ion accumulator cell. In a further addition or as a further alternative thereto, the terminal can be referred to as a pole or electrode. In a further addition or as a further alternative thereto, the battery cell can have a further terminal, in particular with a further safety valve. In particular, the battery apparatus can have a further cell contacting device, wherein the further cell contacting device can have an electrical contact with the further terminal.

The surface of the terminal can be an external surface. In addition or as an alternative thereto, the closed position and the open position can be different. In particular, the safety valve with the moving part in the closed position can be embodied to prevent a discharge of exhaust gas from the inside to the outside. In addition or as an alternative thereto, the safety valve with the moving part in the open position can be embodied to admit a discharge of exhaust gas from the inside to the outside. In a further addition or as a further alternative thereto, the safety valve with the moving part can be embodied to move from the closed position to the open position when a predetermined limit pressure is exceeded by an exhaust gas pressure on the inside of or within the battery cell. In a further addition or as a further alternative thereto, the movement from the closed position into the open position can be an opening-up movement.

The cell contacting device can have no electrical contact with the terminal in the open position of the moving part. Expressed differently: the cell contacting device and/or the moving part can be embodied to destroy the at least one integral connection by way of the movement of the moving part from the closed position into the open position.

In a development of the invention, the battery cell is embodied or configured for a maximum energy content of no less than 9 watt hours (Wh) and/or no more than 360 Wh. This can allow the battery cell to be able to have a relatively high energy content. In particular, the battery cell can be embodied for a maximum energy content of 5 ampere hours times 3.6 volts=18 Wh.

In a development of the invention, the cell contacting device and the terminal are secured against movement relative to one another in the closed position of the moving part by means of the at least one integral connection. This facilitates a reliable electrical contact, particularly in the case of vibration of the terminal and/or of the cell contacting device, for example in contrast to an electrical contact by way of a force-fit connection. In particular, in the closed position of the moving part, the cell contacting device can have a mechanical connection, in particular a direct mechanical connection, with the terminal by means of the at least one integral connection. In addition or as an alternative thereto, the cell contacting device and the terminal cannot or need not be secured against movement relative to one another in the open position of the moving part.

In a development of the invention, the cell contacting device has the at least one integral connection with the terminal in a non-moving part of the surface of the terminal, which differs from the moving part. This facilitates the cell contacting device allowing the movement of the moving part.

In one configuration of the invention, the cell contacting device is disposed, in particular completely disposed, outside of or not within a movement space of the moving part or not within the movement space. In particular, the cell contacting device has a valve cutout for the moving part. In particular, the cell contacting device can be disposed in such a way that the cell contacting device cannot conceal the moving part toward the outside. In addition or as an alternative thereto, the movement space can be provided for the movement of the moving part from the closed position into the open position.

In a development of the invention, the cell contacting device has the at least one integral connection with the terminal in the moving part. Moreover, the cell contacting device is embodied or configured, in particular in part, for co-movement with the moving part, in particular as a contact tongue or contact strip. This facilitates the cell contacting device allowing the movement of the moving part. In particular, the contact tongue can have the at least one integral connection with the terminal in the moving part.

In one configuration of the invention, the cell contacting device applies no force in the inward direction on the moving part in the closed position. This facilitates avoiding an increase in the predetermined limit pressure, to the extent this is present, for example in contrast to an electrical contact by means of a force-fit connection. In particular, the cell contacting device cannot or need not apply a force in the outward direction on the moving part in the closed position. In other words: the cell contacting device could be located on the moving part.

The at least one integral connection can be a soldered connection.

In a development of the invention, the at least one integral connection is a welded connection.

In a development of the invention, the terminal has a predetermined breaking point between the moving part and a non-moving part, in particular the non-moving part, of the surface of the terminal, which differs from the moving part. This, in particular a break or a failure of the predetermined breaking point, facilitates the movement of the moving part from the closed position into the open position and/or a predetermination of the limit pressure, to the extent this is present. In particular, the predetermined breaking point can be or have a notch, an incision or an impression, in particular in the terminal.

In a development of the invention, the terminal is a minus terminal or negative terminal.

In particular, the battery cell can be a prismatic cell.

In a development of the invention, the battery cell is a round cell, in particular an elongate round cell. The terminal is disposed on an end side of the round cell. The moving part is embodied or configured to move along a longitudinal axis of the round cell. In particular, a length of the round cell may be greater than a diameter of the round cell. As an alternative or in addition thereto, the round cell can have a further terminal, in particular the further terminal, on an opposite end side.

In a development of the invention, the terminal is disposed on a side, in particular the end side, of the battery cell. On an opposite side, in particular an end side, the battery cell has a further terminal, in particular the further terminal, with a further safety valve, in particular the further safety valve. This may allow damage to remain small, in particular even if the battery cell can have a particularly high energy content.

In a development of the invention, the battery apparatus has at least one further battery cell. The battery cell and the further battery cell are electrically interconnected by means of the cell contacting device. In particular, the battery apparatus can be referred to as a battery pack. In addition or as an alternative thereto, the battery cell and the further battery cell may be identical, in particular of identical type and/or design. In a further addition or as a further alternative thereto, the battery cell and the further battery cell can be connected in series or in parallel by means of the cell contacting device.

The work system according to the invention has a battery apparatus, in particular the battery apparatus, as described above and an electrically driven work appliance, in particular the electrically driven work appliance. The battery apparatus and the work appliance are embodied or configured to be electrically connected with one another for supplying, more particularly automatically supplying, electrical drive power to the work appliance from the battery apparatus.

In particular, the work system can be a garden, forestry and/or construction work system. In addition or as an alternative thereto, the work appliance can be a garden, forestry and/or construction work appliance. In a further addition or as a further alternative thereto, the work appliance can be a hand-guided work appliance, in particular a ground-guided or hand-held work appliance. In particular hand-guided work appliance, in particular hand-held work appliance, can mean that the work appliance may have a maximum mass of 50 kilograms (kg), in particular 20 kg, in particular 10 kg. In a further addition or as a further alternative thereto, the work appliance can have an electric drive motor. In a further addition or as a further alternative thereto, the battery apparatus and the work appliance can be embodied to be electrically connected to one another, in a releasable manner, in particular without tools and/or without destruction, in particular by means of plug connectors. In a further addition or as a further alternative thereto, the battery apparatus and the work appliance can be embodied to be releasably mechanically connected to one another, in particular releasably connected without tools and/or without destruction. In particular, the work appliance can be embodied to carry the battery apparatus.

In one development of the invention, the electrically driven work appliance is a saw, a pole-mounted pruner, a brush cutter, a hedge trimmer, a hedge cutter, a blower, a leaf blower, a lopper, an angle grinder, a sweeping appliance, a sweeping roller, a sweeping brush, a lawnmower, a scarifier or a grass trimmer.

BRIEF DESCRIPTION OF THE DRAWINGS

Further advantages and aspects of the invention will emerge from the claims and from the following description of preferred exemplary embodiments of the invention, which are explained below on the basis of the figures. In the figures:

DETAILED DESCRIPTION OF THE EXEMPLARY EMBODIMENTS

Figure 1:
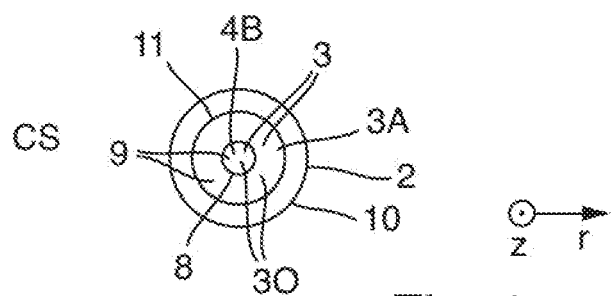
FIG. 1 shows a schematic view of an end side of a battery cell with a safety valve with a moving part in a closed position, of a battery apparatus according to an embodiment of the invention.
Figure 2:
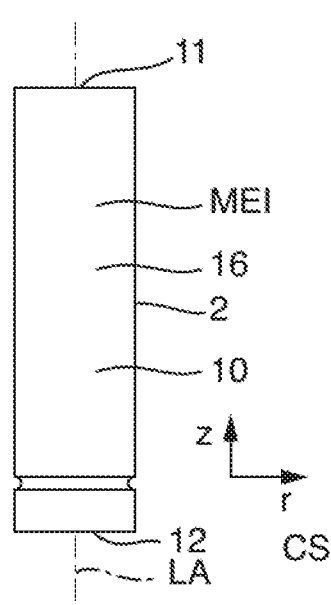
FIG. 2 shows a schematic view of a circumferential side of the battery cell of FIG. 1, with the moving part in the closed position.
Figure 3:
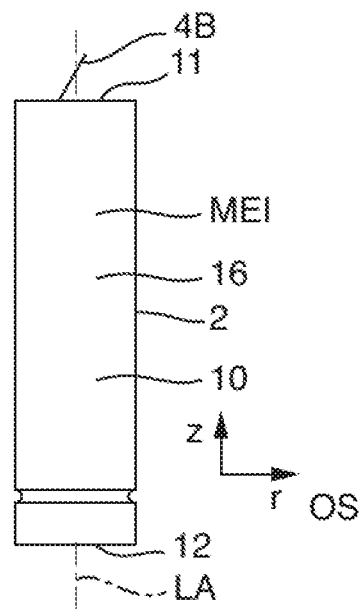
FIG. 3 shows a schematic view of the circumferential side of the battery cell of FIG. 1, with the moving part in an open position.
Figure 4:
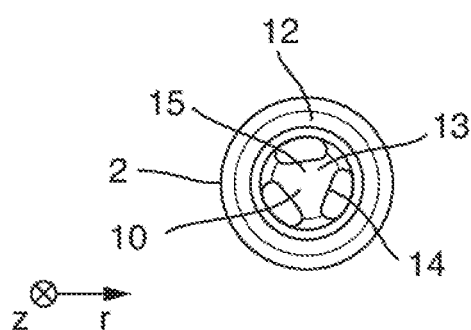
FIG. 4 shows a schematic view of an opposite end side of the battery cell of FIG. 1, with a further safety valve.
Figure 5:
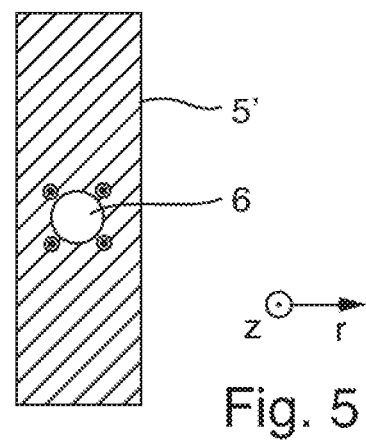
FIG. 5 shows a schematic view of a first exemplary embodiment of a cell contacting device of the battery apparatus according to the invention.
Figure 6:
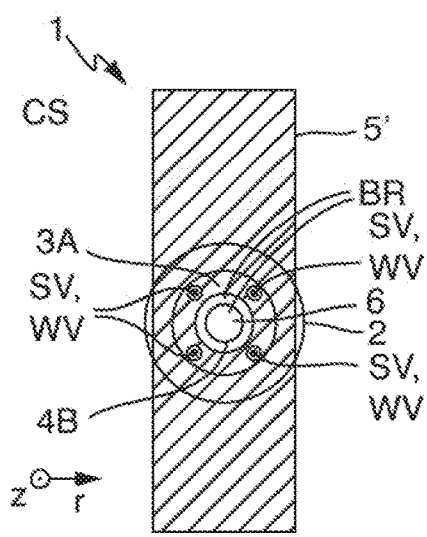
FIG. 6 shows a schematic view of the end side of the battery cell of FIG. 1, with the moving part in the closed position, and the cell contacting device of FIG. 5.
Figure 7:
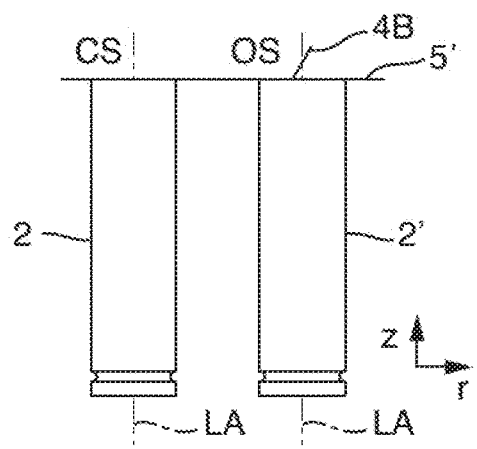
FIG. 7 shows a schematic view of the circumferential side of the battery cell of FIG. 1, with the moving part in the closed position, a circumferential side of a further battery cell with a moving part in the open position, and the cell contacting device of FIG. 5.

FIGS. 1 to 11 show a battery apparatus 1 for supplying electrical drive power AL to an electrically driven work appliance 101. The battery apparatus 1 has at least one battery cell 2 and at least one cell contacting device 5', 5". The battery cell 2 has a terminal 3 with a safety valve 4, as shown in FIG. 1. The safety valve 4 is embodied with a moving part 4B of a surface 3O of the terminal 3, for a movement from a closed position CS, as shown in FIG. 2, in the outward z direction to an open position OS, as shown in FIG. 3. In the closed position CS of the moving part 4B, the cell contacting device 5', 5" has an electrical contact with the terminal 3 by means of at least one integral connection SV, as shown in FIGS. 6, 7 (left), 9 and 10 (left). Moreover, the cell contacting device 5', 5" allows the movement of the moving part 4B, as shown in FIGS. 7 (right) and 10 (right).

In the shown exemplary embodiments, the battery cell 2 is a round cell 10, in particular an elongate round cell. The terminal 3 is disposed on an end side 11 of the round cell 10. The moving part 4B is embodied for movement along a longitudinal axis LA of the round cell 10.

In the shown exemplary embodiments, the longitudinal axis of the round cell 10 is parallel to the outward z direction.

Moreover, the terminal 3 has a predetermined breaking point 8 between the moving part 4B and a non-moving part 3A of the surface 3O of the terminal 3, which differs from the moving part 4B, as shown in FIG. 1.

In the shown exemplary embodiments, the moving part 4B, in particular with a circular embodiment, is surrounded or enclosed by the non-moving part 3A, in particular with a ring-shaped embodiment, in particular in the radial direction r. In particular, the radial direction r is orthogonal to the outward z direction or the longitudinal axis LA.

Moreover, the movement from the closed position CS into the open position OS is an opening-up movement in the shown exemplary embodiments.

Further, the terminal 3 is a negative terminal 9.

Moreover, the battery cell 2, the round cell 10 in the shown exemplary embodiments, has a further terminal 13 with a further safety valve 14 on an opposite side 12, in particular an end side, as shown in FIG. 4.

In particular, the further terminal 13 is a positive terminal 15.

Moreover, the battery cell 2, the round cell 10 in the shown exemplary embodiments, has a circumferential side 16 between the side 11, in particular an end side, and the side 12, in particular an end side.

Moreover, the battery cell 2 is embodied for a maximum energy content MEI of 18 Wh. In alternative exemplary embodiments, the battery cell can be embodied for a maximum energy content of no less than 9 Wh and/or no more than 360 Wh.

In detail, the battery cell 2 is a 21700 cell.

Further, the cell contacting device 5', 5" has a single-piece and/or sheet metal embodiment in the shown exemplary embodiments.

Moreover, the cell contacting device 5', 5" and the terminal 3 are secured against movement relative to one another in the closed position CS of the moving part 5B by means of the at least one integral connection SV, in particular in the outward z direction and/or in the radial direction r.

Moreover, the at least one integral connection SV is a welded connection WV.

In the exemplary embodiment of FIGS. 5 to 7, the cell contacting device 5' has the at least one integral connection SV with the terminal 3 in the non-moving part 3A of the surface 3O of the terminal 3, which differs from the moving part 4B.

In detail, the cell contacting device 5' is disposed outside of a movement space BR of the moving part 4B, in particular in the radial direction r. In particular, the cell contacting device 5' has a valve cutout 6, in particular ring-shaped and/or closed valve cutout, for the moving part 4B.

In the exemplary embodiment of FIGS. 5 to 7, a diameter of the valve cutout 6 is greater than a diameter of the moving part 4B in the radial direction r.

Moreover, the cell contacting device 5' does not conceal the moving part 4B in the outward z direction or along the longitudinal axis LA in the exemplary embodiment of FIGS. 5 to 7.

Figure 8:
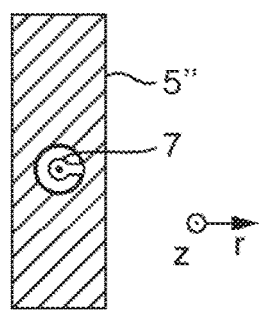
FIG. 8 shows a schematic view of a second exemplary embodiment of a cell contacting device of the battery apparatus according to the invention.
Figure 9:
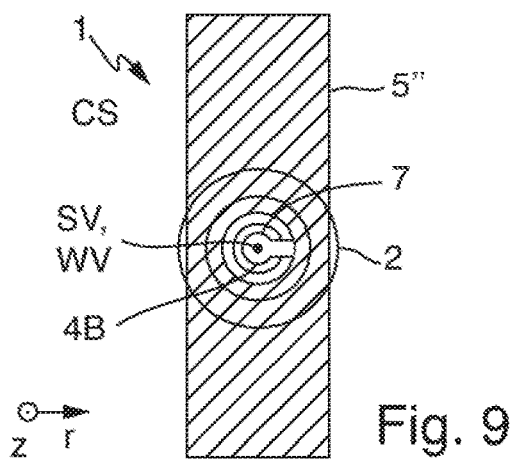
FIG. 9 shows a schematic view of the end side of the battery cell of FIG. 1, with the moving part in the closed position, and the cell contacting device of FIG. 8.
Figure 10:
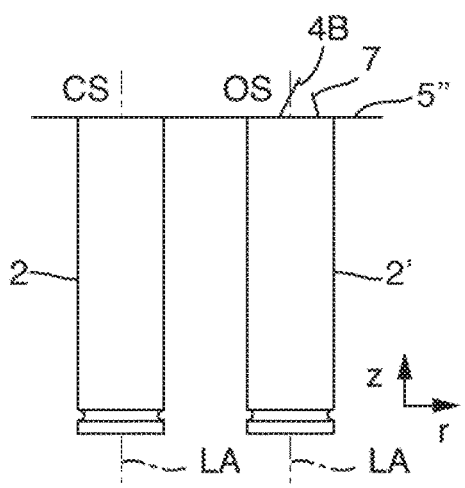
FIG. 10 shows a schematic view of the circumferential side of the battery cell of FIG. 1, with the moving part in the closed position, a circumferential side of a further battery cell with a moving part in the open position, and the cell contacting device of FIG. 8.

In the exemplary embodiment of FIGS. 8 to 10, the cell contacting device 5" has the at least one integral connection SV with the terminal 3 in the moving part 4B. Furthermore, the cell contacting device 5" is embodied, in particular in part, for co-movement or for a co-opening-up movement with the moving part 4B, in particular as a contact tongue 7.

In particular, the contact tongue 7 has the at least one integral connection SV with the terminal 3 in the moving part 4B.

In detail, the cell contacting device 5" applies no inwardly directed −z force and, in particular, no outwardly directed z force on the moving part 4B in the closed position CS.

Moreover, in the exemplary embodiment of FIGS. 5 to 7, the cell contacting device 5' establishes electrical contact with the terminal 3 in the closed position CS of the moving part 4B by means of four integral connections SV. Furthermore, in the exemplary embodiment of FIGS. 8 to 10, the cell contacting device 5" establishes electrical contact with the terminal 3 in the closed position CS of the moving part 4B by means of only a single integral connection SV. In alternative exemplary embodiments, the cell contacting device can establish the electrical contact with the terminal in the closed position of the moving part by means of only a single integral connection or by means of two, three, four or at least five integral connections.

Moreover, in the shown exemplary embodiments, the cell contacting device 5', 5" has no electrical contact with the terminal 3 in the open position OS of the moving part 4B.

Further, the battery apparatus 1 has at least one further battery cell 2', in particular the same type of battery cell, as shown in FIGS. 7 and 10. The battery cell 2 and the further battery cell 2' are electrically interconnected by means of the cell contacting device 5', 5".

In detail, the battery cell 2 and the further battery cell 2' are disposed next to one another, in particular with their longitudinal axes LA parallel to one another.

In alternative exemplary embodiments, the battery apparatus can have only a single battery cell, two battery cells or at least three battery cells.

Moreover, in alternative exemplary embodiments, the battery apparatus can have only a single cell contacting device or at least two cell contacting devices.

Figure 11:
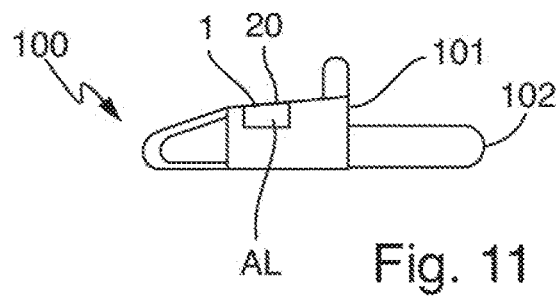
FIG. 11 shows a schematic view of a work system according to the invention, having the battery apparatus according to the invention of FIGS. 1 to 10 and an electrically driven work appliance in the form of a saw.

Moreover, the battery apparatus 1 has an apparatus or pack casing 20, as shown in FIG. 11. The at least one battery cell 2, and in particular the at least one further battery cell 2', and the at least one cell contacting device 5', 5'' are disposed in the apparatus casing 20.

FIG. 11 shows a work system 100 according to the invention. The work system comprises the battery apparatus 1 and an electrically driven work appliance 101. The battery apparatus 1 and the work appliance 101 are embodied for electrical connection, in particular electrically connected, to one another for the purposes of supplying electrical drive power AL to the work appliance 101 from the battery apparatus 1.

In FIG. 11, the electrically driven work appliance 101 is a saw 102. In alternative exemplary embodiments, the work appliance can be a pole-mounted pruner, a brush cutter, a hedge trimmer, a hedge cutter, a blower, a leaf blower, a lopper, an angle grinder, a sweeping appliance, a sweeping roller, a sweeping brush, a lawnmower, a scarifier or a grass trimmer.

In FIG. 11, the work appliance 101, in particular the saw 102, is embodied to carry, in particular carries, the battery apparatus 1.

As the exemplary embodiments shown and explained above make clear, the invention provides a battery apparatus for supplying electrical drive power to an electrically driven work appliance, wherein the battery apparatus has improved properties, in particular being safer, and a work system having such a battery apparatus and an electrically driven work appliance.

What is claimed is:

1. A battery apparatus for supplying electrical drive power to an electrically driven work appliance, wherein the battery apparatus comprises:
    at least one battery cell, wherein a battery cell of the at least one battery cell has a terminal with a safety valve, wherein the safety valve is configured as a moving part of an external surface of the terminal, with movement from a closed position for outward movement into an open position; and
    at least one cell contacting device, wherein a cell contacting device of the at least one cell contacting device has electrical contact with the terminal by way of three, four or at least five integral connections in the closed position of the moving part and allows the movement of the moving part,
    wherein the three, four or at least five integral connections are disposed radially outward of a valve cutout opening through the cell contacting device so as to surround the moving part in a ring-shaped manner,
    wherein, radially outward of the integral connections, the cell contacting device is a solid body without any non-valve cutout openings therethrough.

2. The battery apparatus according to claim 1, wherein the battery cell is embodied for a maximum energy content of no less than 9 Wh and/or no more than 360 Wh.

3. A battery apparatus for supplying electrical drive power to an electrically driven work appliance, wherein the battery apparatus comprises:
    at least one battery cell, wherein a battery cell of the at least one battery cell has a terminal with a safety valve, wherein the safety valve is configured as a moving part of an external surface of the terminal, with movement from a closed position for outward movement into an open position; and
    at least one cell contacting device, wherein a cell contacting device of the at least one cell contacting device has electrical contact with the terminal by way of three, four or at least five integral connections in the closed position of the moving part and allows the movement of the moving part,
    wherein the three, four or at least five integral connections are disposed radially outward of a valve cutout opening through the cell contacting device so as to surround the moving part in a ring-shaped manner, wherein
    the cell contacting device and the terminal are secured against movement relative to one another in the closed position of the moving part by the three, four or at least five integral connections, and
    radially outward of the three, four or at least five integral connections, the cell contacting device is a solid body without any non-valve cutout openings therethrough.

4. The battery apparatus according to claim 1, wherein the cell contacting device has the three, four or at least five integral connections with the terminal in a non-moving part of the surface of the terminal, which differs from the moving part.

5. The battery apparatus according to claim 4, wherein the cell contacting device is disposed outside of a movement space of the moving part.

6. The battery apparatus according to claim 1, wherein at least two integral connections are welded connections.

7. The battery apparatus according to claim 1, wherein the terminal has a predetermined breaking point between the moving part and a non-moving part of the surface of the terminal, which differs from the moving part.

8. The battery apparatus according to claim 1, wherein the terminal is a negative terminal.

9. The battery apparatus according to claim 1, wherein the battery cell is an elongate round cell, wherein the terminal is disposed on an end side of the round cell and wherein the moving part is embodied for movement along a longitudinal axis of the round cell.

10. The battery apparatus according to claim 1, wherein the terminal is disposed on a side of the battery cell, and the battery cell has a further terminal with a further safety valve on an opposite side.

11. The battery apparatus according to claim 1, further comprising:
    at least one further battery cell, and
    wherein the battery cell and a further battery cell of the at least one further battery cell are electrically interconnected by the cell contacting device.

12. A work system, wherein the work system comprises:
    a battery apparatus according to claim 1; and
    an electrically driven work appliance,
    wherein the battery apparatus and the work appliance are embodied for electrical connection to one another for purposes of supplying electrical drive power to the work appliance from the battery apparatus.

13. The work system according to claim 12, wherein the electrically driven work appliance is a saw, a pole-mounted pruner, a brush cutter, a hedge trimmer, a hedge cutter, a blower, a leaf blower, a lopper, an angle grinder, a sweeping appliance, a sweeping roller, a sweeping brush, a lawnmower, a scarifier or a grass trimmer.

14. A battery apparatus, comprising:
a first elongate battery cell and a second elongate battery cell disposed next to one another with their longitudinal axes being parallel to one another, at least one of the first and second elongate battery cells having an end face with a terminal, the terminal comprising a safety valve configured as a moving part of an external surface of the terminal with movement from a closed position for outward movement into an open position;
a single-piece cell contacting device comprising one or more openings therethrough that are only in the form of valve cutout openings to allow the outward movement of the moving part of the safety valve,
wherein the cell contacting device makes electrical contact with the terminal comprising the safety valve by way of three, four or at least five integral connections arranged in a ring-shaped manner around an associated valve cutout opening so as to secure the cell contacting device and the terminal against relative movement,
wherein the first elongate battery cell and the second elongate battery cell are electrically interconnected by the cell contacting device.

* * * * *